(12) United States Patent
Sunoue et al.

(10) Patent No.: US 7,463,253 B2
(45) Date of Patent: Dec. 9, 2008

(54) ON-VEHICLE ELECTRONIC EQUIPMENT, DISPLAY PANEL, AND PANEL MOUNTING BASE

(75) Inventors: Maho Sunoue, Kumamoto-ken (JP); Mamoru Takahashi, Takasaki (JP)

(73) Assignee: Victor Company of Japan, Limited, Yokohama (JP)

( * ) Notice: Subject to any disclaimer, the term of this patent is extended or adjusted under 35 U.S.C. 154(b) by 942 days.

(21) Appl. No.: 11/028,511

(22) Filed: Jan. 4, 2005

(65) Prior Publication Data
US 2005/0162376 A1    Jul. 28, 2005

(30) Foreign Application Priority Data
Jan. 7, 2004    (JP) .......................... P2004-002466

(51) Int. Cl.
*G09G 5/00*    (2006.01)
(52) U.S. Cl. ...................... 345/204; 348/837; 248/157
(58) Field of Classification Search ................ 345/104, 345/204, 905; 248/157, 917–920; 361/678, 361/681; 348/794, 836–838
See application file for complete search history.

(56) References Cited

U.S. PATENT DOCUMENTS 5,161,028 A * 11/1992 Kawata et al. .............. 348/837
6,663,155 B1 * 12/2003 Malone et al. ............. 296/37.8
2005/0099547 A1 * 5/2005 Vitito ......................... 348/739

FOREIGN PATENT DOCUMENTS

| JP | 07-277089 | * 10/1995 |
|---|---|---|
| JP | 08-292724 | 11/1996 |
| JP | 08-318792 | 12/1996 |
| JP | 10-329616 | 12/1998 |

* cited by examiner

*Primary Examiner*—Jimmy H Nguyen
(74) *Attorney, Agent, or Firm*—Nath Law Group; Jerald L. Meyer; Derek Richmond

(57) ABSTRACT

A case body which can accommodate a display panel and a traveling unit provided movably inside this case body are provided. In the traveling unit, a traveling mechanism for performing reciprocation and a panel revolution mechanism for performing an revolution operation of the display panel ejected from the case body are provided. A panel coupling portion attachably and detachably coupling the display panel with the traveling unit is provided. The panel coupling portion is rotated by the panel revolution mechanism in order to revolve the display panel. A locking tool is provided in the panel coupling portion, and the locking tool is moved between the release position at which separation of the display panel from the panel coupling portion is allowed by the panel revolution mechanism and the lock position at which the separation of the display panel from the panel coupling portion is prevented.

9 Claims, 18 Drawing Sheets

ON-VEHICLE ELECTRONIC EQUIPMENT, DISPLAY PANEL, AND PANEL MOUNTING BASE

BACKGROUND OF THE INVENTION

1. Field of the Invention

The present invention relates to on-vehicle electronic equipments, a display panel, and a panel mounting base, and particularly to a display panel performing as a display for television or a car navigation system, and display panel is assembled with an electric equipment and coupled with a panel mounting base so that the display panel can be carried away to the outside of the vehicle or the like, and the electric equipment and the panel mounting base has a stolen preventing means for preventing the display panel being stolen when the display panel is assemble with the electric equipment.

2. Description of the Related Art

Recently, on the occasion of transferring by an automobile, a car navigation system which can display an optimum route or the like to a destination on a display panel become popular, and in general, such a display panel has been used also as a television monitor or a video monitor widely.

As this type of display panel, a transportable type display panel is also popular. This display panel is compactly integrally formed with an equipment main body in which a disk drive for driving a DVD or the like, a television tuner, and the like are embedded. Additionally, this display panel has been arranged on the dashboard or the like inside the vehicle. With such a display panel, there is an advantage that the display panel can also be utilized outside the vehicle, however, there are drawbacks that the appearance of the inside of the vehicle is spoiled, that the risk of being stolen is high, and the like (For example, First related art: Japanese Patent Application Laid-Open Publication No. 8-292724).

As another example of this type of display panel, there is a device has been put into practical use in which the equipment main body is embedded inside the dashboard or the like, and the display panel attached thereto is made a movable type so that the display panel is made open inside the passenger compartment of a vehicle from the inside of the dashboard while taking a standing posture when the panel is used (For example, Second related art: Japanese Patent Application Laid-open Publication No. 8-318792).

Further, a device has been known in which the display panel which is openable inside the passenger compartment of a vehicle while taking a standing posture is made an operation display unit which is formed integrally with a CD unit so that this display panel is detachable from an accommodation unit provided inside the dashboard (For example, Third related art: Japanese Patent Application Laid-open Publication No. 10-329616).

SUMMARY OF THE INVENTION

However, since the on-vehicle monitor as shown in the first related art is fixed on a monitor attachment device provided on the dashboard, there is a problem that the appearance of the inside of the vehicle is spoiled when the monitor is installed. Particularly, although such an on-vehicle monitor has an advantage that the monitor can be separated from the attachment device in an unused state to prevent the monitor from being stolen, such an attachment/detachment operation is troublesome. Further, since a handle for fixing the monitor is in an exposed state, in a case where removing the monitor is forgotten, the risk of theft is high.

Similarly, since the operation display unit itself of the third related art also does not possess a lock function, and since the unit is only fixed by a lock arm which is provided on an attachment side in an exposed state, the risk of theft is high. Although a plug connected with a receptacle of the attachment side is provided on the operation display unit, there is a fear that both parts are inappropriately connected.

Conventional monitors as disclosed in the first and third related arts are generally formed integrally with the equipment main body into which a disk drive for driving a disk such as CD or the like and a television tuner are embedded, and the monitors are heavy and are thick, hence there is a problem that portability is poor.

Further, according to the second related art, since the entire unit including the display panel (monitor unit) is integrally assembled, there is a theft prevention effect. However, since the entire unit has to be condensed at one location to be assembled, the productivity is poor, and persons who can view the display image of the display panel are limited to a driver and a fellow passenger on the assistant driver's seat.

With the device of the third related art, it is possible to take the operation display unit out of the inside of the dashboard and to watch a video or listen to music which is recorded on a media for example CD on a rear seat. However, since taking in to and out of the operation display unit, an opening operation, and attachment and detachment operations are manually operated, performing these respective operations during traveling of the vehicle accompanies a risk, and the risk that the operation display unit which has been stood up falls down inadvertently by vibrations during a vehicle traveling time is high. Furthermore, since such an operation display unit is only locked by means of a manual type lock arm provided on a mounting unit in an exposed state, there is a fear that the operation display unit is stolen during the car is parked or the like regardless of whether or not the unit is in a state in which the unit is drawn from the dashboard.

The present invention has been made in consideration of the circumstances above, and it is an object of the present invention to automatically perform eject and open operations of a display panel on an on-vehicle electronic equipment which is coupled with the display panel, to be able to draw the display panel out of a case body which is fixed inside a dashboard or the like as the need arises, not to be stolen even when a person leaves the car leaving the display panel inside the vehicle, and moreover to be able to utilize the display panel as a television monitor and the like for a rear seat.

Further, it is an object of the present invention to provide a display panel which is a detachable/attachable and transportable type which can be connected to variety of electronic equipment to be driven, whose theft prevention effect and portability are excellent, and which is highly handy.

In order to achieve the above-described object, according to the present invention, there is provide an on-vehicle electronic equipment comprising: a display panel having a display surface; a case body accommodating the display panel; a traveling unit which is movably provided inside the case body and which allows the display panel to move in insertion direction and eject direction with respect to the case body, a guide portion provided inside the case body to guide the movement of the traveling unit; and a drive source, wherein the traveling unit further including: a traveling mechanism reciprocating along the guide portion, a revolvable panel coupling portion attachably and detachably coupling the display panel with the traveling unit, and a panel revolution mechanism revolving the display panel ejected from the case body and the panel coupling portion by a drive force generated by the drive source being rotated in a first direction so that the display surface of the display panel faces in a eject direction of the display panel with respect to the case body, the panel coupling portion further including a locking tool for locking the display panel to the traveling unit, and wherein the locking tool is moved between a release position at which separation of the display panel from the traveling unit is allowed by the panel revolution mechanism and a lock position at which the separation of the display panel from the traveling unit is prevented, and the movement from the lock position to the release position of the locking tool is performed by a drive force generated by the drive source being rotated in a second direction which is a reverse direction to the first direction of the drive source.

Here, it is preferred that the panel revolution mechanism has a lacking tooth gear fixed on a revolution fulcrum shaft of the panel coupling portion and a transmission gear meshing with this lacking tooth gear, that the locking tool has a gear portion meshing with the transmission gear and a lock arm inserted into the display panel, that power is transmitted from the transmission gear to the gear portion in a state in which the lacking tooth gear and the transmission gear are uncoupled while the locking tool is moved from the lock position to the release position, and that the lacking tooth gear and the transmission gear mesh with each other while the locking tool is maintained at the lock position at the time of revolution of the display panel.

It is preferred that the traveling unit includes a sensor detecting an operation amount of the panel revolution mechanism, in order to move the locking tool from the release position to the lock position of the locking tool, and to control a revolution angle of the panel coupling portion.

Further, it is preferred that the panel coupling portion has a signal output portion inputting a visual signal to the display panel and a guide pin inserted into the display panel.

In order to carry out the above-described object, according to another aspect of present invention, there is provided a panel mounting base connected to the on-vehicle electronic equipment of the above-described structure by a signal line, the panel mounting base having a base with an insertion opening into which one end portion of the display panel is fitted in a standing posture of the display panel and an attachment tool for fixing the base on a part inside a passenger compartment of a vehicle, wherein a signal output portion which is coupled with the display panel so that a visual signal transmitted via the signal line is inputted to the display panel is provided inside the insertion opening of the base.

Further, in order to achieve the above-described object, according to another aspect of present invention, there is provided a display panel having a display surface comprising, an outer frame which has a window portion to expose the display surface from the window portion, an operation portion including operation switches provided on one end side in the direction intersecting with the display surface on the outer frame, an input terminal provided on the other end side of the outer frame opposing the one end side and connected to an output terminal provided on an attachment portion attaching the display panel for obtaining a visual signal, a lock hole provided on the other end side of the outer frame and equipped with a hooking claw, a pin insertion hole provided on the other end side of the outer frame for positioning with respect to the attachment portion, and a lock mechanism provided inside the outer frame and including a trigger lever restraining the hooking claw and a slide plate for maintaining the restraint of the hooking claw by the trigger lever.

Here, it is preferred that a lock operation hole for operating the slide plate from the outside is provided on the other end side of the outer frame.

Further, it is preferred that the input terminal, the lock hole, and the pin insertion hole are provided on a recess-like socket which is formed in such a manner that one end edge of the back surface of the outer frame opposing the window portion extends toward the inside and that the socket is a coupling portion with respect to the attachment portion. It is preferred that the lock operation hole also is provided on the socket.

DETAILED DESCRIPTION OF THE INVENTION

The present invention will be described below in detail with reference to the drawings.

Figure 1A:
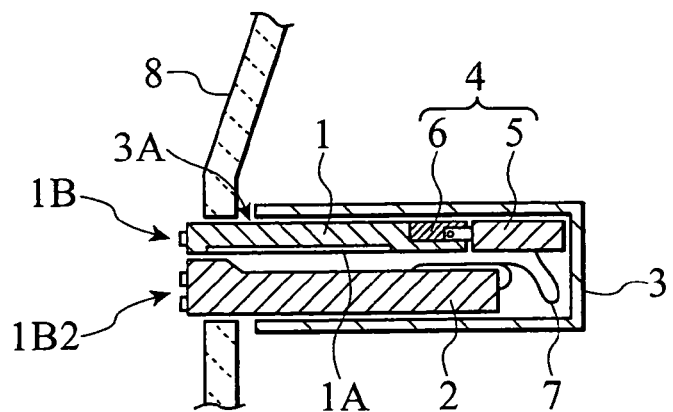
FIGS. 1A, 1B, and 1C are explanatory views showing an embodiment of on-vehicle electronic equipment according to the present invention.
Figure 1B:
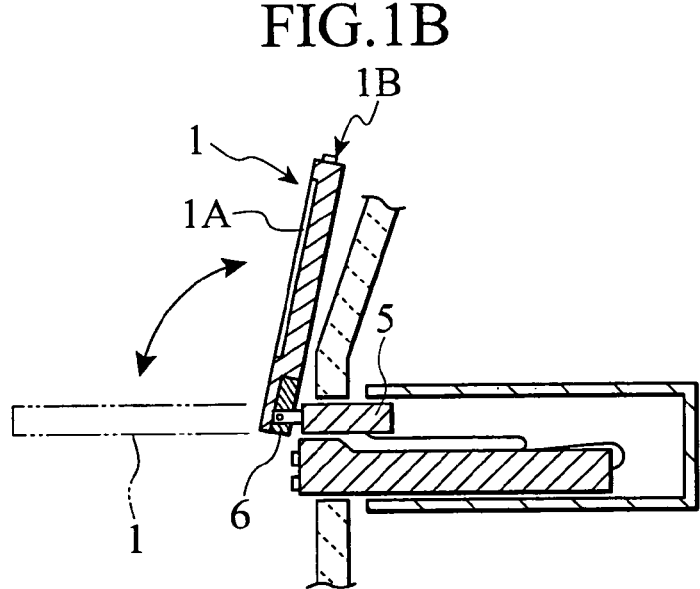
Figure 1C:
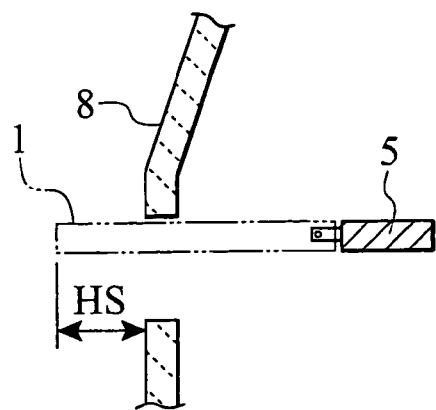

With reference to FIGS. 1A to 1C, reference numeral 1 denotes a display panel of a flat shape (a display device of a panel shape) having a display surface 1A constituted by a liquid crystal panel or image display elements such as organic ELs, reference numeral 2 denotes an equipment main body (a disk reproduction device driving a disk such as a DVD or the like in the present example) driving the display panel, and reference numeral 3 denotes a case body accommodating the display panel 1 and the equipment main body 2. A traveling unit 4 for performing eject/insertion of the display panel 1 is provided inside the case body 3 so as to be reciprocatable in a front-to-back direction (left-to-right direction of FIG. 1A). Specifically, the traveling unit 4 is constructed such that a panel coupling portion 6 for coupling the display panel 1 with one end portion of a unit base 5 is revolvably provided, and the panel coupling portion 6 is connected with the equipment main body 2 via a flexible line 7.

Recorded information (a visual signal of a map, a video, and the like) of a disk driven to be reproduced inside the equipment main body 2 is inputted to the display panel 1 from the flexible line 7 via the panel coupling portion 6, and thus an image is displayed on the display surface 1A of the display panel.

The case body 3 has an opening portion 3A into which the display panel 1 is ejected from/inserted to, and the opening portion 3A is fixed inside the dashboard 8 of the vehicle, opposing the automobile interior, and the display panel 1 is accommodated inside the case body 3 in a lying state in which the display surface 1A faces downwardly as in FIG. 1A. In this state, although one end surface of the display panel in a direction intersecting the display surface 1A is exposed from the opening portion 3A, the end surface is an operation section 1B having operation switches, and by such operations, the display panel 1 can be ejected from the opening portion 3A outside the case body 3 or can be drawn to the inside of the case body to be accommodated therein. Such operations may be performed in an operation section 1B2 of the equipment main body 2 as well as in the operation section 1B.

With the operation section 1B, a case can be selected where the display panel 1 is only ejected while being in the lying state as shown by the imaginary line of FIG. 1B or where the display panel 1 is erected (stood) from the lying state to a standing posture to be opened as shown by the solid line of FIG. 1B, and the display panel 1 ejected in the lying state is allowed to be separated from the panel coupling portion 6 while the display surface 1A of the display panel 1 of the standing posture faces the automobile interior side (eject side of the display panel 1 with respect to the case body 3) so that this display surface 1A can be visually recognized from the driver's seat and the like.

The position at which the display panel 1 can be ejected from the panel coupling portion 6 is not limited to the position at which the whole of the display panel 1 is ejected toward the outside of the dashboard as in FIG. 1B, and the position at which the distance from the end portion of the display panel 1 in the lying posture to the dashboard 8 becomes a distance HS by which the display panel 1 can be grasped by a hand may be a detachable position (see FIG. 1C). For example, the distance HS can be set to 50 mm. The case where the display panel 1 is detached, a detachment button is pressed in the state of FIG. 1C, and a lock state of the display panel 1 is released to remove the display panel 1. Details of this lock mechanism will be described later herein.

In the state in which the display panel 1 is opened in the standing posture, separation of the display panel 1 from the panel coupling portion 6 is prevented, and the angle (angle of revolution) of the display panel 1 is made adjustable within an arbitrary angle range with respect to the horizontal surface. This angle is supposed to be for example 60-105 degrees. The eject/insertion operation of the display panel 1 of the lying posture is performed by the reciprocating movement of the traveling unit 4 inside the case body 3, and later-described guide portions performing movement guide of the traveling unit 4 along the insert direction and the discharge direction of the display panel 1 are provided on both sides inside the case body 3.

Figure 2:
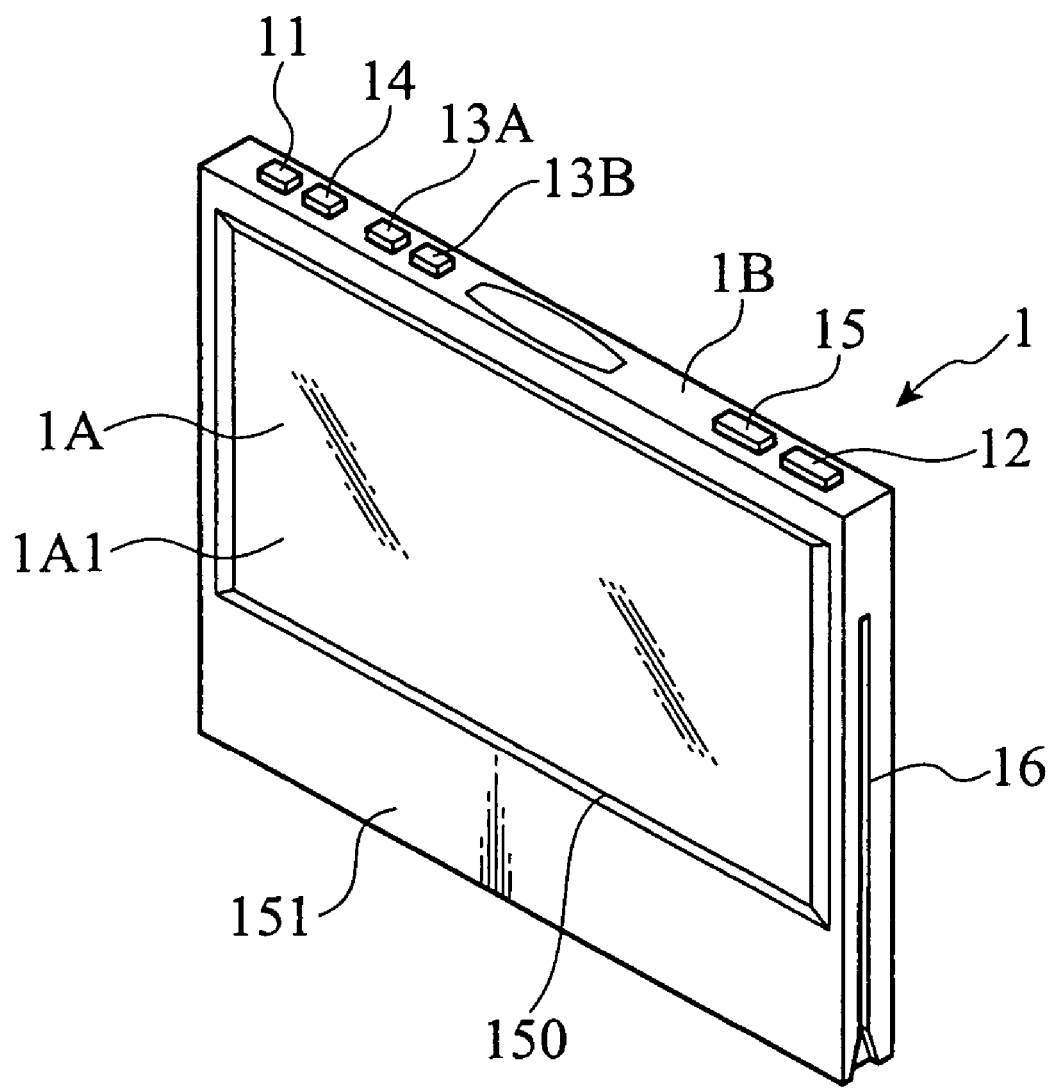
FIG. 2 is a perspective view showing the front surface side of a display panel.

Referring to FIG. 2, the display panel 1 has liquid crystal or flat image display elements 1A1 such as organic ELs forming the display surface 1A and an outer frame 151 forming a window portion 150, and the image display elements 1A1 are installed inside the outer frame 151 in a state in which the display surface 1A is exposed from the window portion 150.

In one end of the display panel 1, that is, in the operation portion 1B, provided with a main power source switch 11, an operation switch 12 for opening and closing operations, operation switches 13A, 13B for performing angle adjustment when the display panel 1 is opened, an operation switch 14 for operations of ejection and insertion, and a resolution selection switch 15. Guide grooves 16 are formed on both side surfaces perpendicular to the operation portion 1B along the longitudinal direction of the side surfaces.

Figure 3:
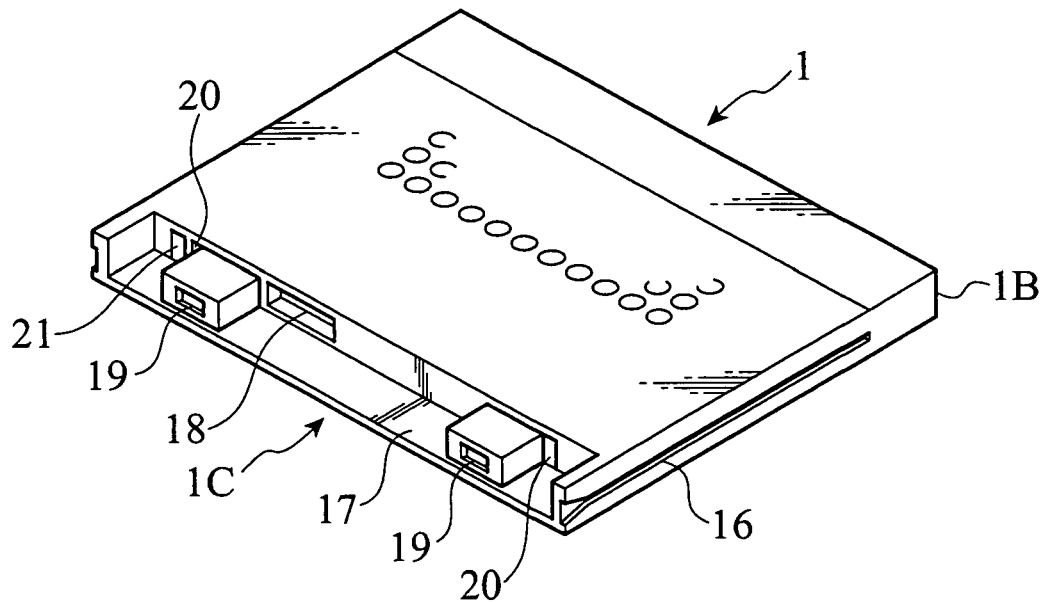
FIG. 3 is a perspective view showing the back surface side of the display panel.
Figure 4:
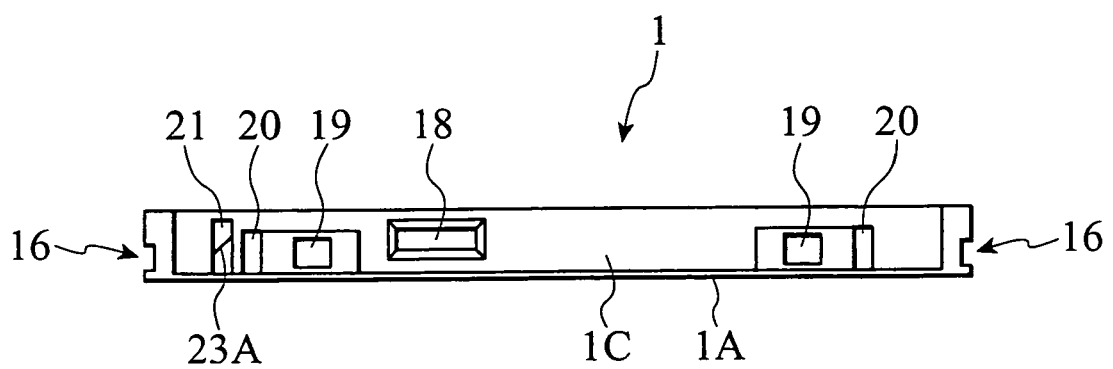
FIG. 4 is a bottom view of the display panel.

Referring to FIG. 3, one end surface (bottom end surface in the present example) opposing the operation portion 1B is a coupling portion 1C for coupling with the above-mentioned panel coupling portion 6, and this coupling portion 1C is constructed in such a manner that the back surface side of the display panel 1 is partially notched to form a recess-like socket 17 and that pin insertion holes 19 for positioning, lock holes 20, and a lock operation hole (picking hole) 21 as well as a signal input portion 18 (input terminal) which is for receiving a visual signal are provided toward the operation portion 1B side inside the socket 17 as shown in FIGS. 3 and 4. Furthermore, later-described hooking claws are disposed on the lock holes 20.

The pair of pin insertion holes 19 and the pair of lock holes 20 are formed while being spaced apart at predetermined distances in the width direction of the display panel 1, and the pin insertion holes 19 play a role of positioning in which the pin insertion holes 19 receive guide pins of a later-described partner side to reliably connect the signal input portion 18 and an external output terminal. An audio signal can also be transmitted from the signal input portion 18, and in this case, by providing a speaker on the display panel 1 or providing an audio output terminal to connect this audio output terminal with a headphone, audio can be listened to.

Figure 5:
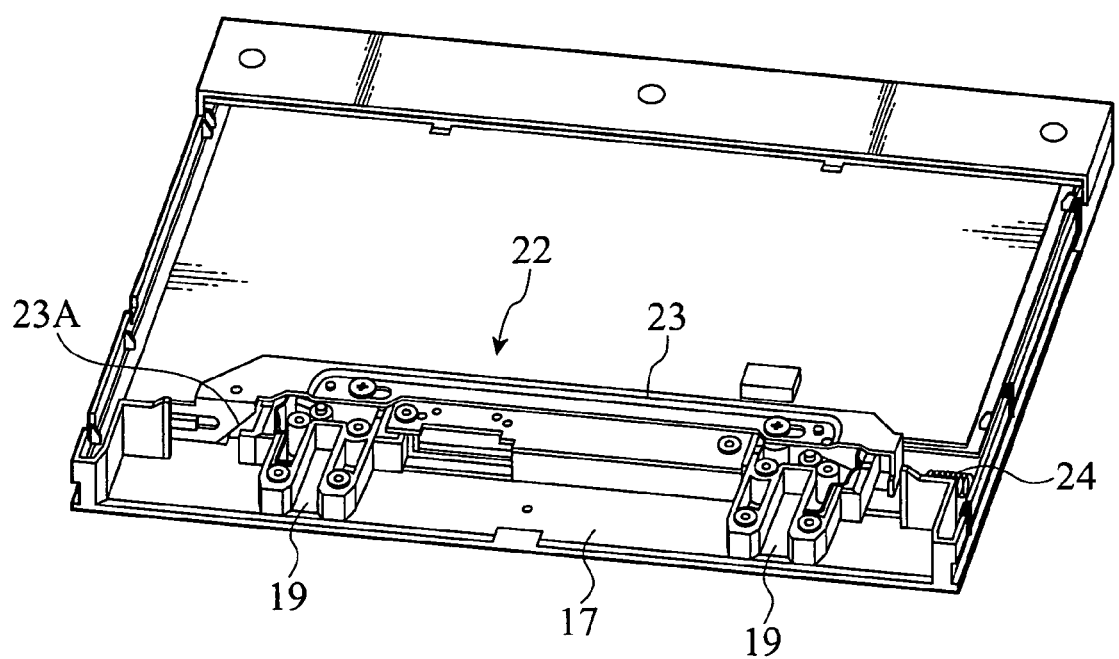
FIG. 5 is a perspective view showing the internal structure of the display panel.

Referring to FIG. 5, a lock mechanism 22 is incorporated in the coupling portion IC side in the display panel 1. This lock mechanism 22 has a slide plate 23 forming a sloped lock operation surface 23A corresponding to the lock operation hole 21 of FIG. 4. The slide plate 23 is slidably disposed in the width direction of the display panel 1 and is urged in a direction of non-lock side (the right direction in FIG. 5) by a biasing means such as for example a coil spring, a leaf spring, or the like, which is connected with one end of the slide plate 23.

Figure 6:
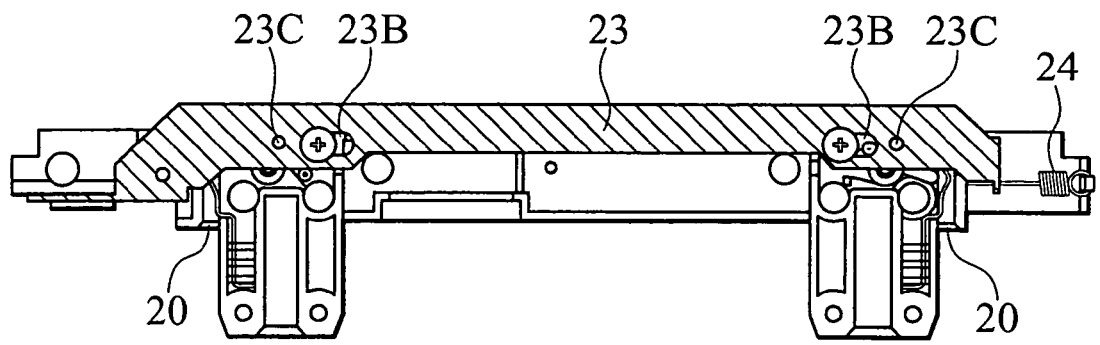
FIG. 6 is an explanatory view showing a lock mechanism embedded in the display panel.
Figure 7:
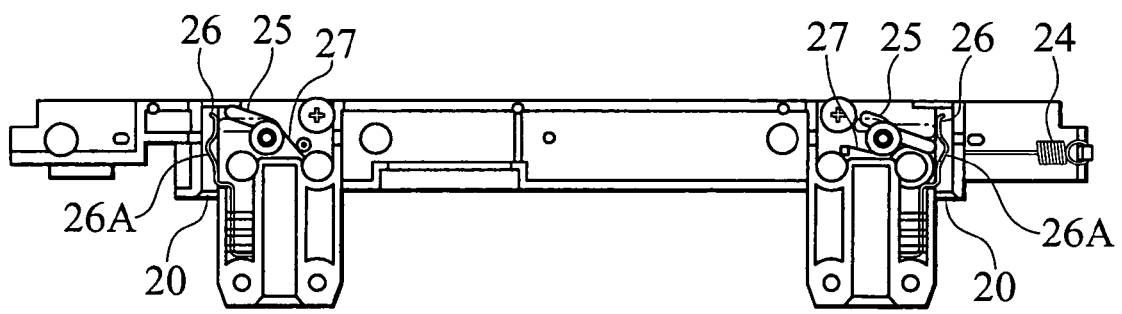
FIG. 7 is an explanatory view showing an operation state of the lock mechanism.

Referring to FIGS. 6 and 7, elongated holes 23B for movability and pins 23C protruding downwardly (depth direction on the FIGS) are provided on the slide plate 23. Meanwhile, trigger levers 25 corresponding to the pins 23C of the slide plate 23 is rotatably attached to the lock mechanism 22 as is apparent from FIG. 7, and lock levers 26 constituted by leaf springs are provided in the proximity of the trigger levers 25. Return springs 27 are attached to the rotation axes of the trigger levers 25, so that the trigger levers 25 are urged during the non-locked state in the clockwise direction of FIG. 7. When these trigger levers 25 are rotated by pressure force due to the sliding movement of the pins 23C of the slide plate in the counterclockwise direction of FIG. 7 against the elasticity of the return springs 27 (locked state), end portions of the trigger levers 25 come in contact with the lock levers 26 so that these lock levers 26 are fixed.

The lock levers 26 have protruding portions 26A which are formed by bending of one end portions thereof, and one end sides forming the protruding portions 26A are disposed inside the lock holes 20 as free ends. Thus, by inserting parts of the panel coupling portion 6 into the lock holes 20, the protruding portions 26A of the lock levers 26 engage these parts. In this state, when the trigger levers 25 are brought in contact with the lock levers 26 to fix the lock levers 26, whereby separation of the display panel 1 from the panel coupling portion 6 is prevented. When the trigger levers 25 are spaced apart from the lock levers 26 to release the lock levers 26, bending deformation of the lock levers 26 is allowed so that the display panel 1 can be detached from the panel coupling portion 6.

Figure 9:
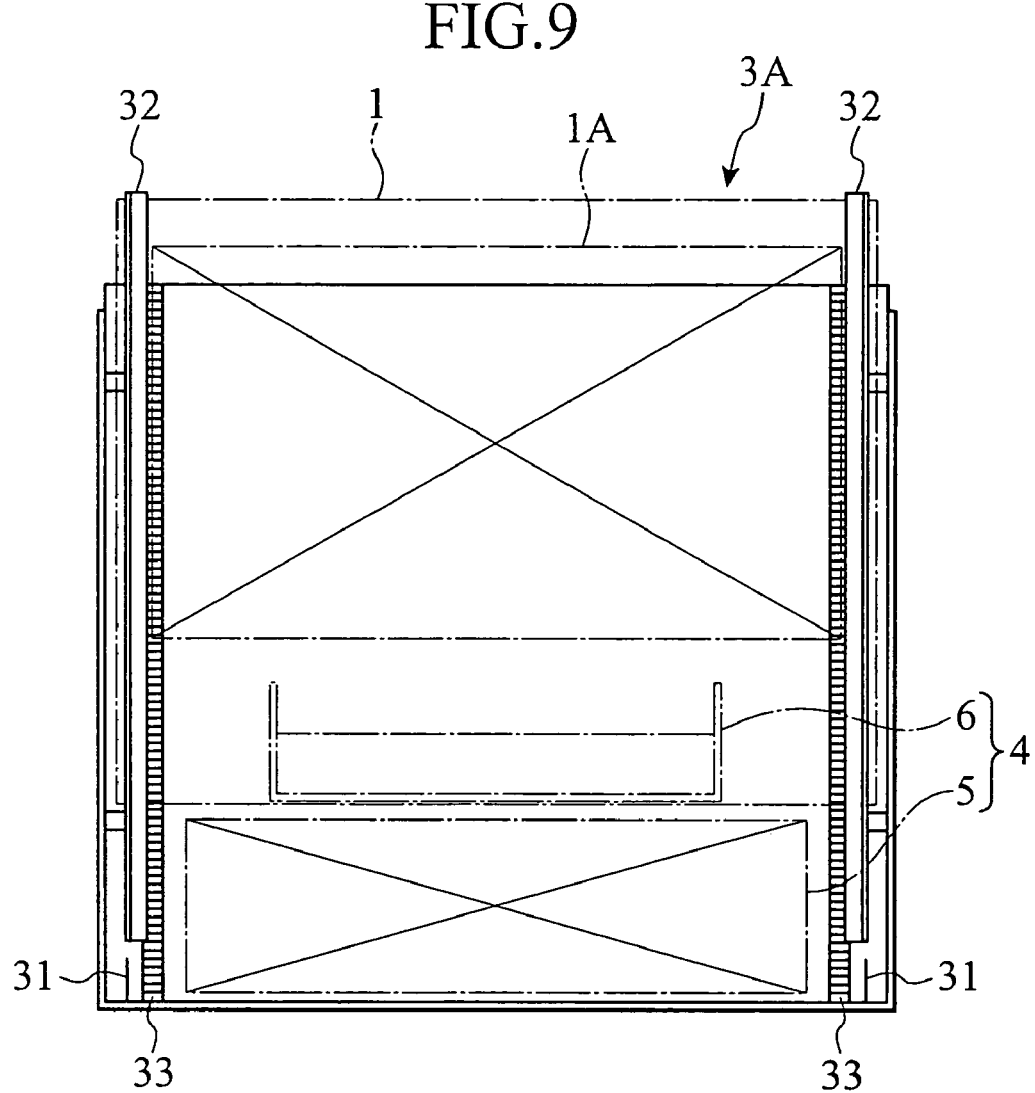
FIG. 9 is a cross-sectional view, taken along line IX-IX of FIG. 8.
Figure 10:
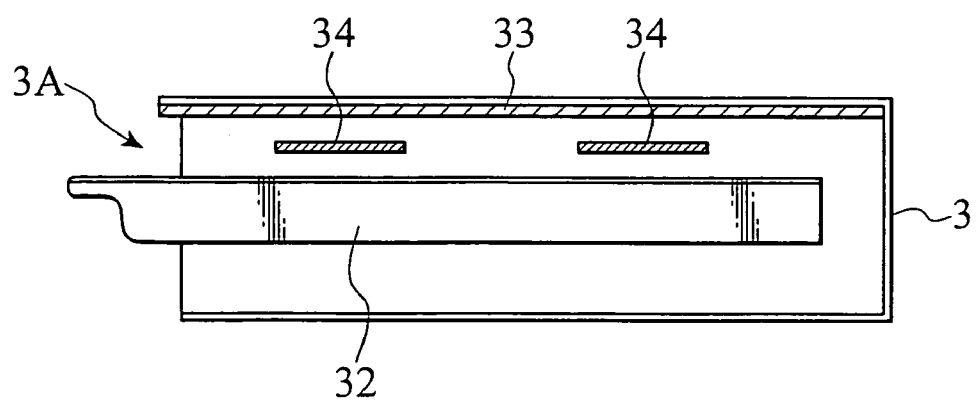
FIG. 10 is a cross-sectional view, taken along line X-X of FIG. 8.

Next, the structure of the case body 3 will be described. Referring to FIGS. 9 and 10, above-mentioned guide portions 31 (linear projected portions extending in the depth direction of FIG. 8) and 32 (guide rails of an L shape) for guiding movement of the traveling unit 4 are provided on both sides of the inside of the case body 3. Racks 33 by which the traveling unit 4 reciprocates along the guide portions 31, 32 are provided on the ceiling surface inside the case body 3, and projecting panel guides 34 guiding the display panel 1 along the guide portions 32 are provided in the vicinity of the guide portions 32, such that the panel guides 34 are slidably fitted into the guide grooves 16 of the display panel 1 (shown in FIGS. 2 to 4). Further, as is apparent from FIG. 10, one ends of the guide portions 32 overhang from the opening portion 3A of the case body 3 so that the unit base 5 of the traveling unit can be supported by the guide portions 32 at a predetermined discharge amount even when the panel coupling portion 6 is discharged from the opening portion 3A.

Figure 11:
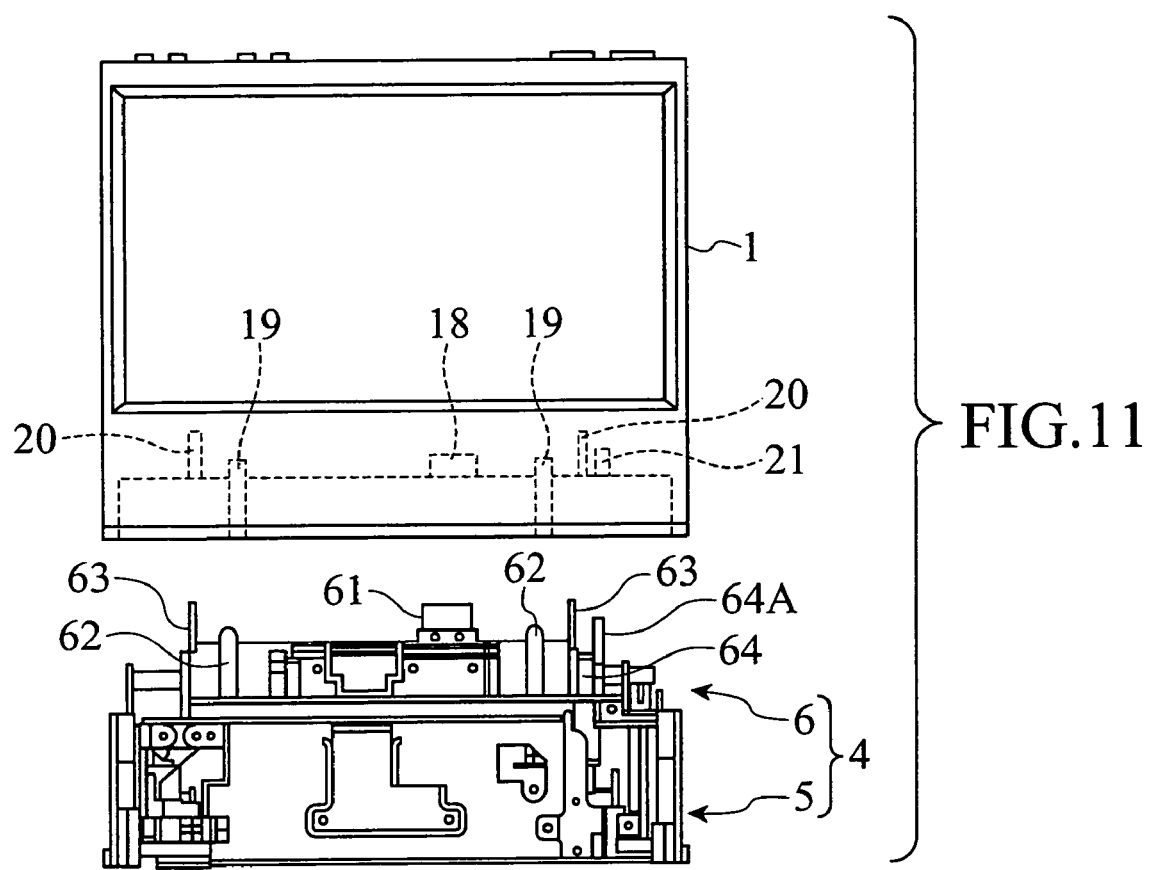
FIG. 11 is a plan view showing a state in which the display panel is separated from a panel coupling portion.
Figure 12:
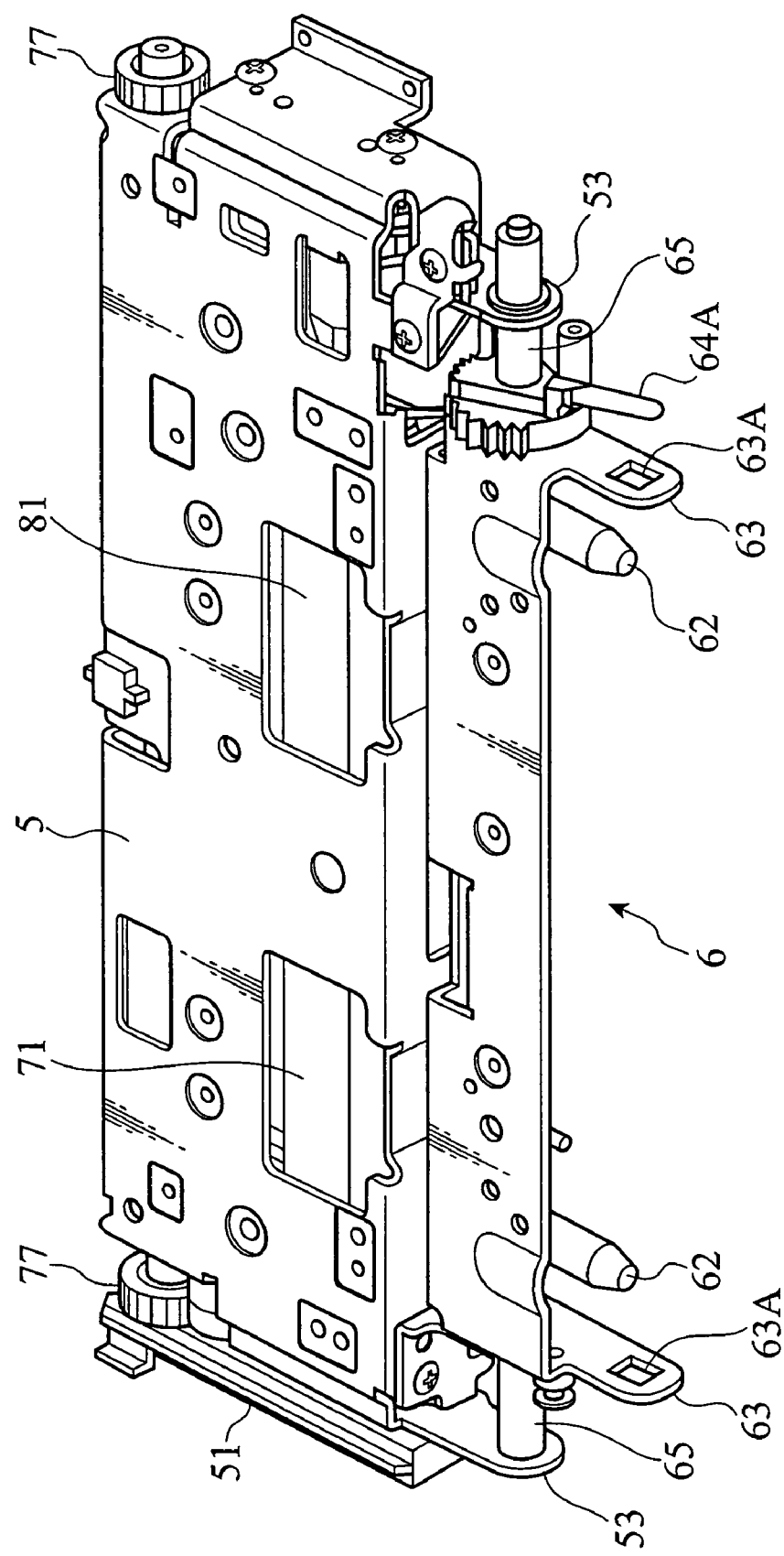
FIG. 12 is a perspective view showing the back side of a traveling unit.
Figure 13:
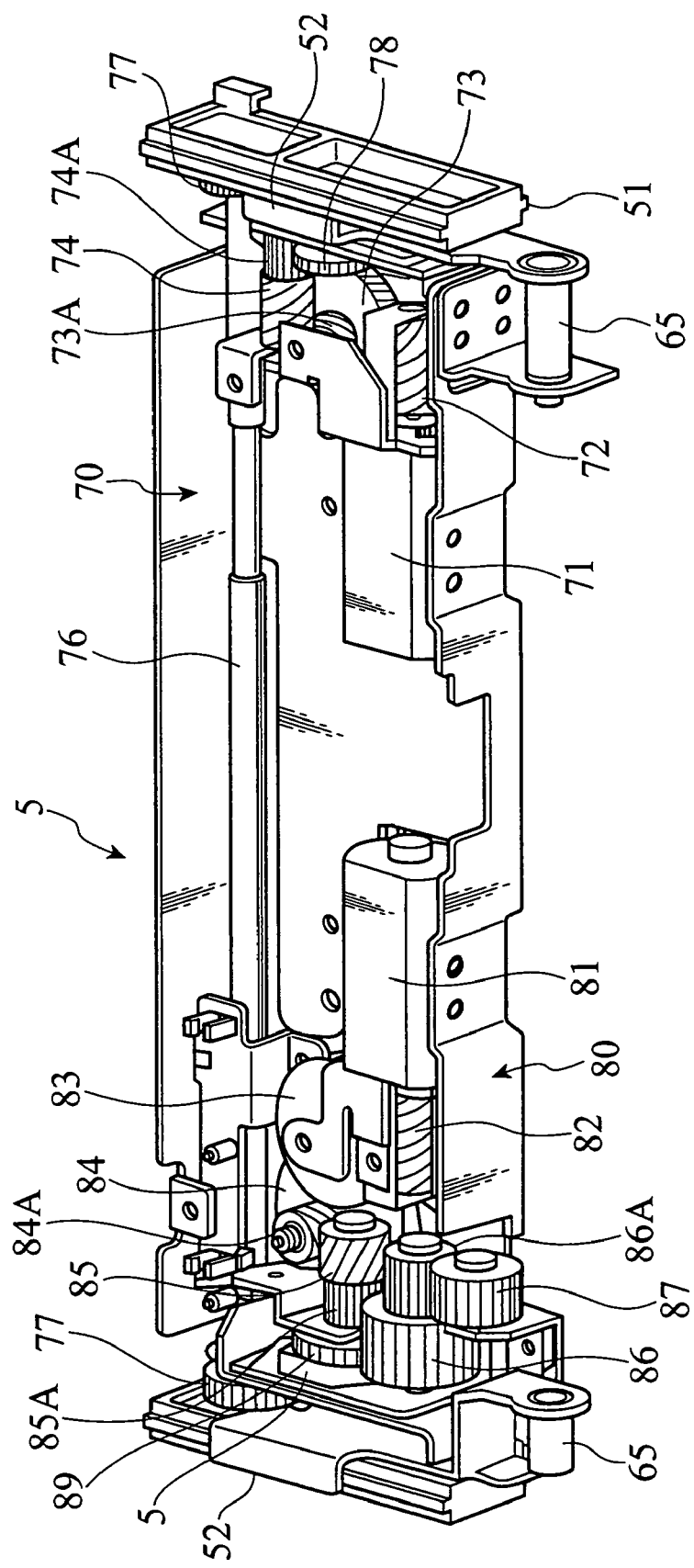
FIG. 13 is a perspective view showing the front side of the traveling unit in which the panel coupling portion is omitted.

Next, the structure of the traveling unit 4 will be described. Referring to FIGS. 11 to 13, the traveling unit 4 is composed of the unit base 5 and the panel coupling portion 6 attached thereto.

A signal output portion 61 (output terminal) connected with the signal input portion 18 of the display panel 1, a pair of left and right guide pins 62 inserted into the pin insertion holes 19, a pair of left and right latches 63 inserted into the lock holes 20, and a locking tool 64 provided with a lock arm 64A inserted into the lock operation hole 21 are provided with the panel coupling portion 6. The flexible line 7 shown in FIG. 1 is connected with the signal output portion 61. Lock holes 63A are formed in the latches 63 such that the lock holes 63A is configured to engage with the protruding portions 26A of the lock levers 26 shown in FIG. 7.

Figure 8:
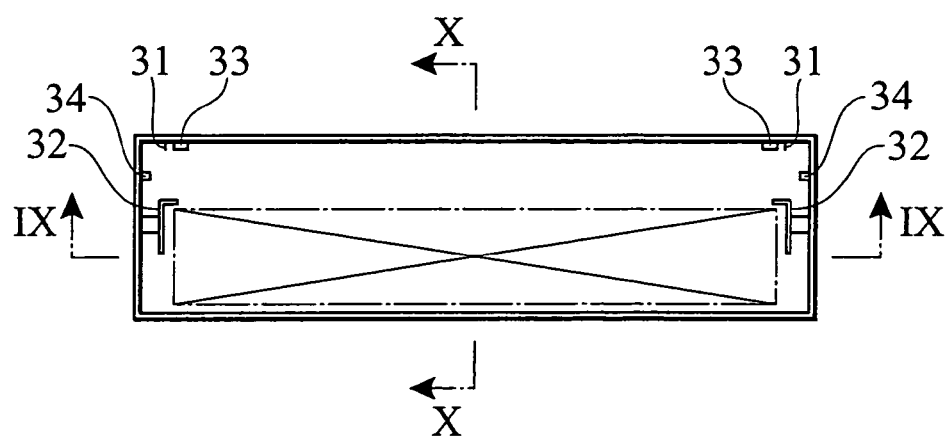
FIG. 8 is a schematic front view of a case body.

Meanwhile, as shown in FIG. 12, guide receivers 51, 52 which are engaged with the guide portions 31, 32 of the case body 3 shown in FIG. 8 and a pair of left and right brackets 53 are formed in the unit base 5. In the panel coupling portion 6, a rotation support shaft 65 protruding from both sides of the panel coupling portion 6 is rotatably supported by the brackets 53, and a later-described lacking tooth gear is provided as well as the above-mentioned locking tool 64 on the rotation support shaft 65.

As shown in FIG. 13, in the traveling unit 4 (specifically the unit base 5 thereof), a traveling mechanism 70 for reciprocating along the guide portions 31, 32 provided inside the case body 3 and a panel revolution mechanism 80 for revolving the display panel coupled with the panel coupling portion 6 are provided.

Figure 14:
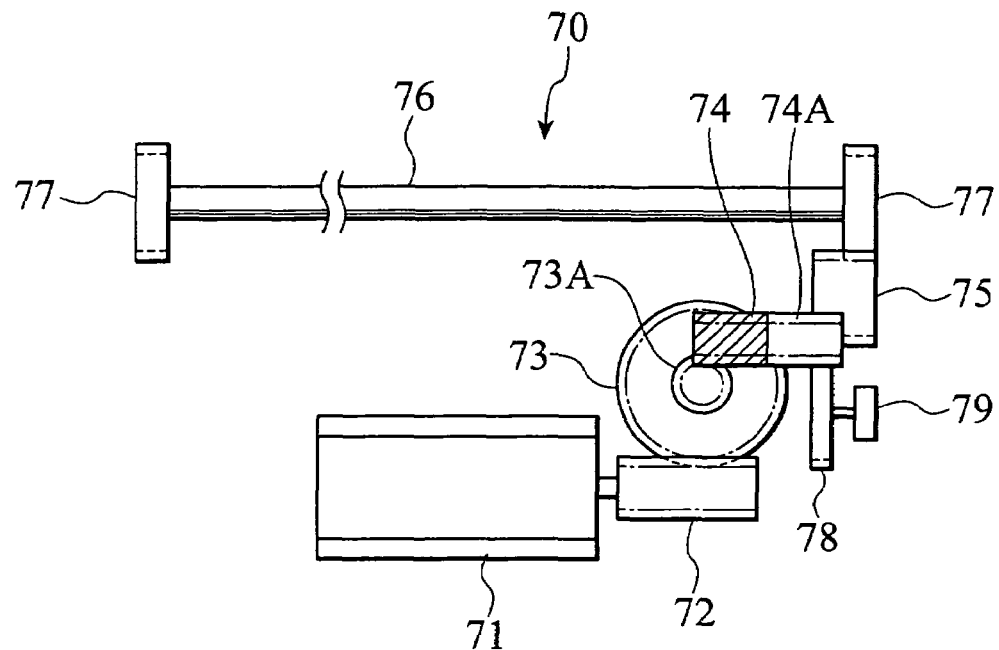
FIG. 14 is an explanatory view showing a traveling mechanism.

As shown in FIGS. 13 and 14, the traveling mechanism 70 is composed of a traveling drive source 71, a worm 72 attached to the drive shaft of the drive source 71, a worm wheel 73 meshing with the worm 72, a helical gear 74 meshing with a worm portion 73A formed integrally with the worm wheel 73, a gear 75 meshing with an output gear portion 74A formed integrally with the helical gear 74, and pinions 77 which are provided on both sides of a rotation shaft 76 and one of which meshes with the gear 75, such that the pinions 77 mesh with the racks 33 inside the case body 3 shown in FIG. 8 and the like. A rotation amount detection gear 78 meshes with the gear portion 74A, and the rotation amount of this gear 78 is detected by a sensor 79, such that based on this rotation amount stop control of the drive source 71 is performed.

Figure 15:
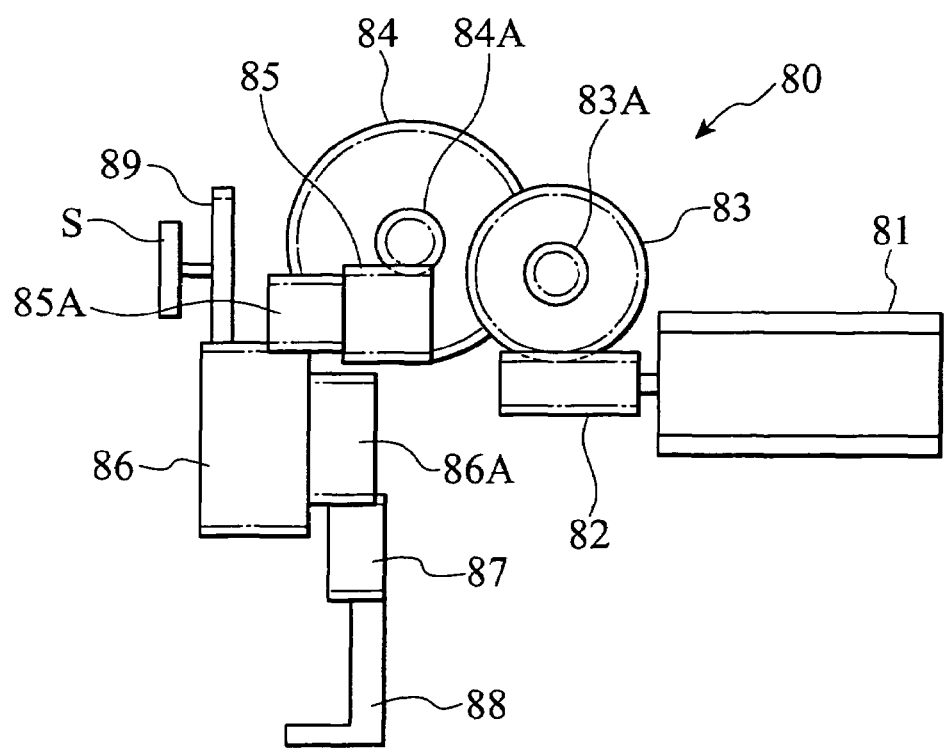
FIG. 15 is an explanatory view showing a panel revolution mechanism.

Meanwhile, as shown in FIGS. 13 and 15, the panel revolution mechanism 80 is composed of a revolution drive source 81, a worm 82 attached to the drive shaft of the drive source 81, a worm wheel 83 meshing with this worm 82, a gear 84 meshing with a gear portion 83A formed integrally with this worm wheel 83, a helical gear 85 meshing with a worm portion 84A formed integrally with the gear 84, a gear 86 meshing with a gear portion 85A formed integrally with the helical gear 85, a transmission gear 87 meshing with a small diameter gear portion 86A of the gear 86, and the above-mentioned lacking tooth gear 88 meshing with the transmission gear 87, such that the lacking tooth gear 88 is fixed on the panel coupling portion 6 taking the rotation support shaft 65 as the fulcrum thereof and that other the other gears 82-87 are disposed on the unit base 5.

Further, a revolution amount detection gear 89 meshes with the gear 86 so that the revolution amount thereof (that is, an operation amount of the panel revolution mechanism 80) is detected by a sensor S. Based on a detection signal of the sensor S, drive control for the drive source 81 is performed, so that the revolution amount of the panel coupling portion 6 (revolution amount of the display panel 1) and a switching operation of later-described release position and lock position of the locking tool 64 are controlled.

Figure 16:
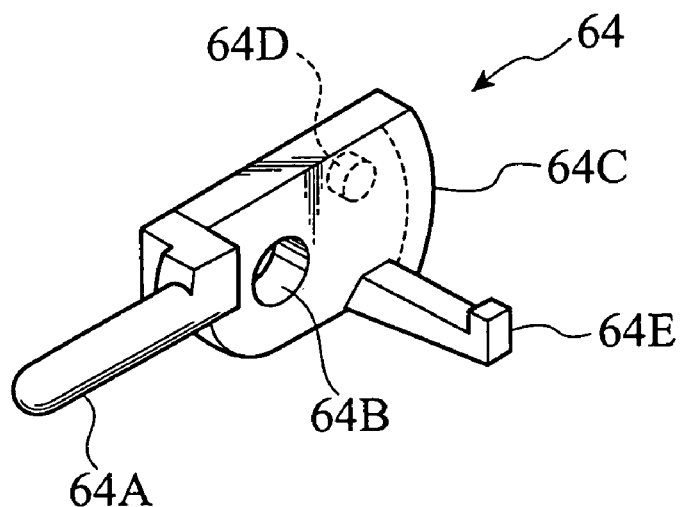
FIG. 16 is a perspective view of a locking tool.
Figure 17:
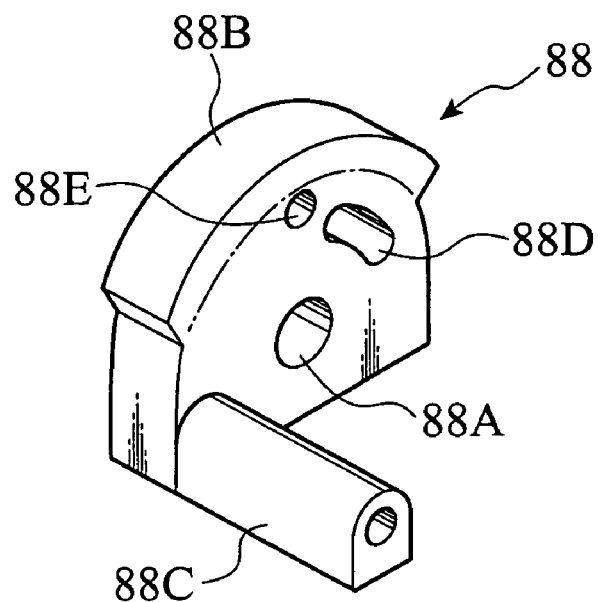
FIG. 17 is a perspective view of a lacking tooth gear.
Figure 18:
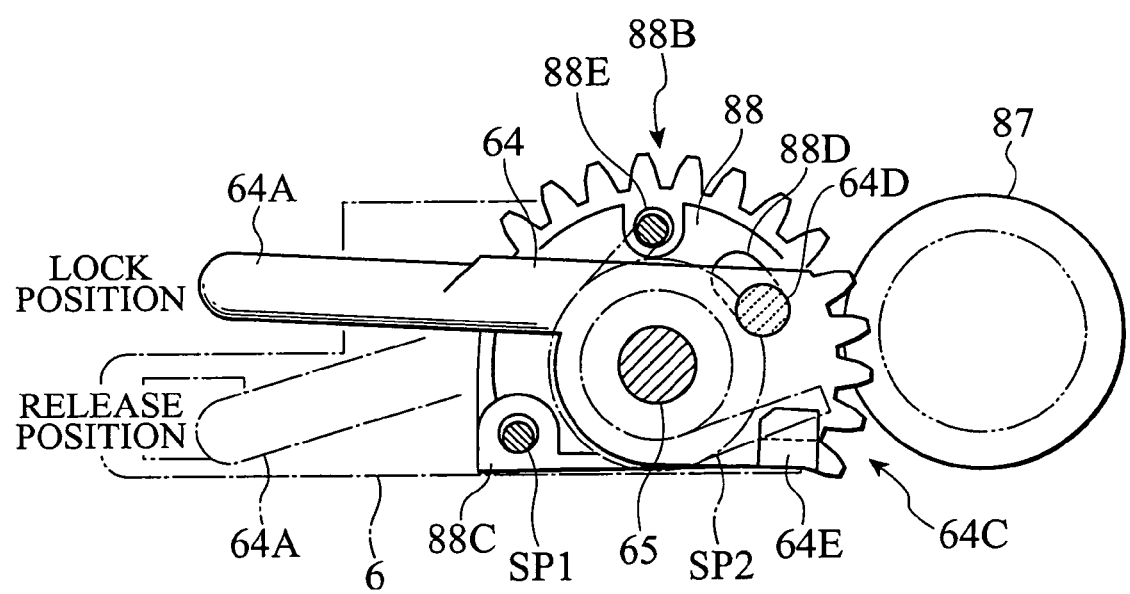
FIG. 18 is a combined figure of the locking tool and the lacking tooth gear.

Referring to FIGS. 16 to 18, the locking tool 64 has an arc-shaped gear portion 64C about an attachment hole 64B into which the rotation support shaft 65 is inserted, as well as the lock arm 64A. The lock arm 64A protrudes in the radius direction of the attachment hole 64B, a protrusion 64D is provided on a side surface of the locking tool 64, and a spring stopper 64E protrudes out of the reverse side surface thereof.

Meanwhile, as shown in FIG. 17, the lacking tooth gear 88 also forms an arc-shaped gear portion 88B about an attachment hole 88A into which the rotation support shaft 65 is inserted. An arc groove 88D is formed about a spring stopper 88C and the attachment hole 88A on a side surface of the lacking tooth gear 88, such that the protrusion 64D of the locking tool 64 is fitted into the arc groove 88D.

The locking tool 64 and the lacking tooth gear 88 are arranged adjacent to each other on the same axis (the rotation support shaft 65 of the panel coupling portion 6) as shown in FIG. 18. The lacking tooth gear 88 is fixed on a side surface of the panel coupling portion 6, and this panel coupling portion 6 is urged in the counterclockwise direction (lying direction of the display panel) of FIG. 18 by means of a return spring SP1 whose one end securely engages the spring stopper 88C of the lacking tooth gear 88 on the rotation support shaft 65. Meanwhile, the locking tool 64 is urged in the clockwise direction shown in FIG. 18 which is opposite to that of the lacking tooth gear 88 by the return spring SP2 provided around the rotation support shaft 65 such that the relative position thereof with respect to the lacking tooth gear 88 is maintained at the lock position indicated by solid lines. One end of the return spring SP2 securely engages the spring stopper 64E of the locking tool 64, and the other end thereof securely engages a hole 88E provided in the lacking tooth gear 88.

Before an open operation of the display panel 1, the gear portion 64C of the locking tool 64 and the transmission gear 87 mesh each other in the vicinity of the gear portion 88B of the lacking tooth gear 88. In this state, when the drive source 81 (see FIG. 13) is driven to rotate the transmission gear 87 in the counterclockwise direction in FIG. 18, the locking tool 64 rotates in the clockwise direction, and immediately after this, the protrusion 64D of the locking tool 64 presses one end of the arc groove 88D of the lacking tooth gear 88 so that meshing with the transmission gear 87 is switched from the locking tool 64 to the lacking tooth gear 88. At this time, by the operation of the return spring SP2, while the locking tool 64 is maintained at the lock position with respect to the panel coupling portion 6, the lacking tooth gear 88 is rotated in the clockwise direction. Thus, the panel coupling portion 6 formed integrally with the lacking tooth gear 88 also rotates in the same direction, and thus the display panel 1 being coupled with the panel coupling portion 6 also revolves in the clockwise direction of FIG. 18 about the rotation support shaft 65 thereby the open operation thereof is performed.

Meanwhile, when the drive source 81 (see FIG. 13) is driven in the reverse direction with respect to the open operation of the display panel 1 described above to rotate the transmission gear 87 in the clockwise direction of FIG. 18, in the state in which the transmission gear 87 and the lacking tooth gear 88 are uncoupled, power is transmitted from the transmission gear 87 to the locking tool 64 having the gear portion 64C meshing therewith. At this time, the panel coupling portion 6 formed integrally with the lacking tooth gear 88 is maintained in a non-operation state by means of an stopper which is not shown, and only the locking tool 64 (specifically the lock arm 64A thereof) is rotated from the lock position represented by a solid line to a release position represented by an imaginary line.

The lock arm 64A of the locking tool 64 is inserted into the lock operation hole 21 of the display panel 1 as described above, and at the lock position represented by the solid line of FIG. 18, the lock arm 64A pushes the lock operation surface 23A of the slide plate 23 shown in FIG. 5 so that the slide plate 23 is slid to the lock side (the left direction of FIG. 5) against the elasticity of the spring 24. Thus, the lock levers 26 of the display panel 1 and the latches 63 of the panel coupling portion 6 are maintained in an engagement state, and separation of the display panel 1 from the panel coupling portion 6 can be prevented.

When the locking tool 64 is at the release position represented by the imaginary line of FIG. 18, the lock arm 64A thereof is distanced apart from the lock operation surface 23A of the slide plate 23 shown in FIG. 5 so that the slide plate 23 is returned to the non-lock side (the right direction of FIG. 5) by the operation of the spring 24 to allow the display panel 1 to be detached from the panel coupling portion 6.

In this manner, although the locking tool 64 works to operate the lock mechanism 22 inside the display panel 1, the lock arm 64A may be a hook shape so that the head thereof securely engages a portion inside the display panel 1 at the lock position. In this case, the lock mechanism 22 inside the display panel 1, the latches 63 of the panel coupling portion 6, and the like can be omitted to make the entire device a simple structure.

As is apparent from the description above, while the locking tool 64 is at the lock position during an open/close operation time of the display panel 1 by revolution of the panel coupling portion 6 to prevent the display panel 1 from being detached, switching of the locking tool 64 from the lock position to the release position is made possible before the open operation of the display panel 1. However, the switching operation of the locking tool 64 to the release position is preferred to be restricted such that this switching operation is performed at the time when opening operation of the display panel 1 from the case body 3 is completed, whereby the risk that the display panel 1 is detached inadvertently at the reciprocation time of the traveling unit 4 can be prevented.

Further, in a case where the display panel 1 is not pulled out of the panel coupling portion 6 even after a predetermined time elapses after the eject operation of the display panel 1 is completed, it is preferred that the locking tool 64 is returned to the lock position so that pull-in and insertion into the case body 3 of the display panel 1 is performed. According to this structure, the display panel 1 is prevented from slipping off due to running vibration of the vehicle or the like and that theft of the case where detachment of the display panel 1 is forgotten and the vehicle is left as it is can be prevented.

Figure 19:
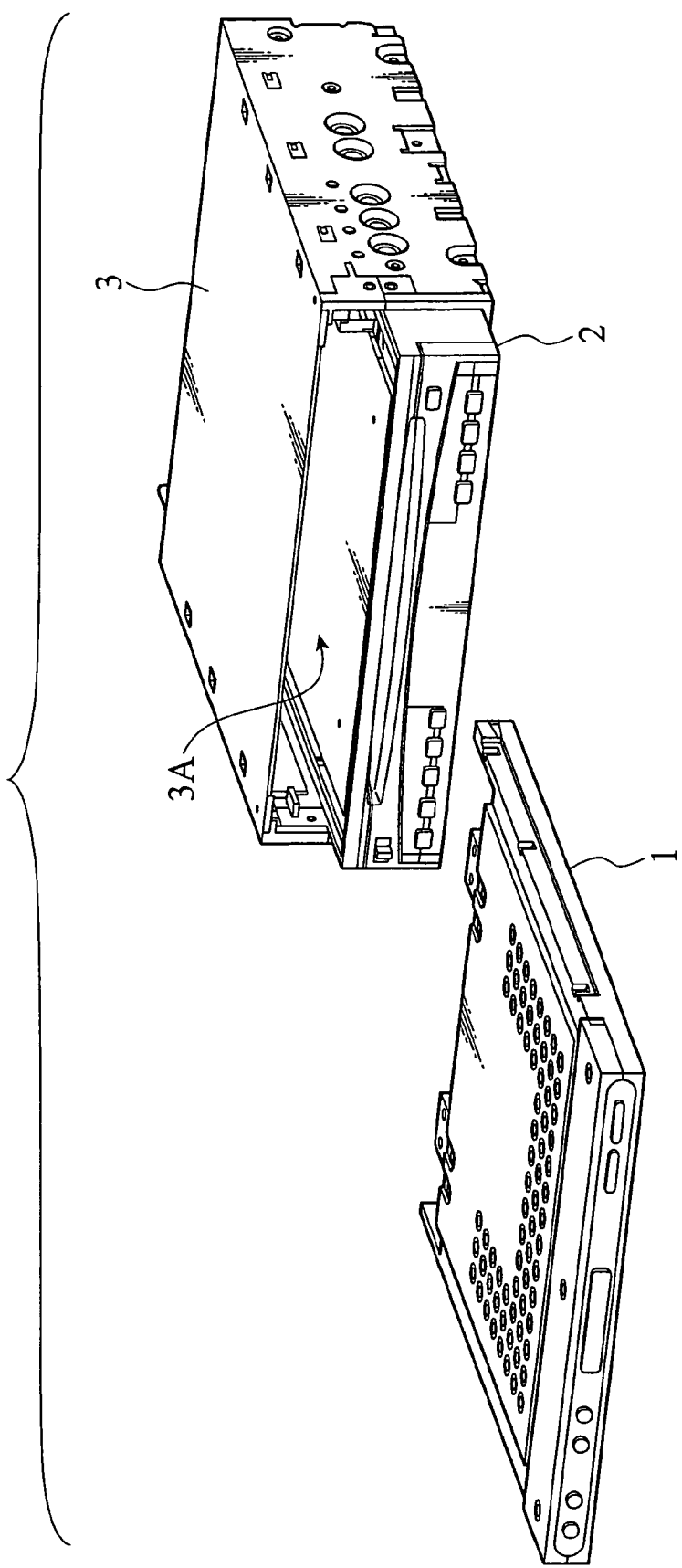
FIG. 19 is a perspective view showing a detachment state of the display panel and a case body.
Figure 20:
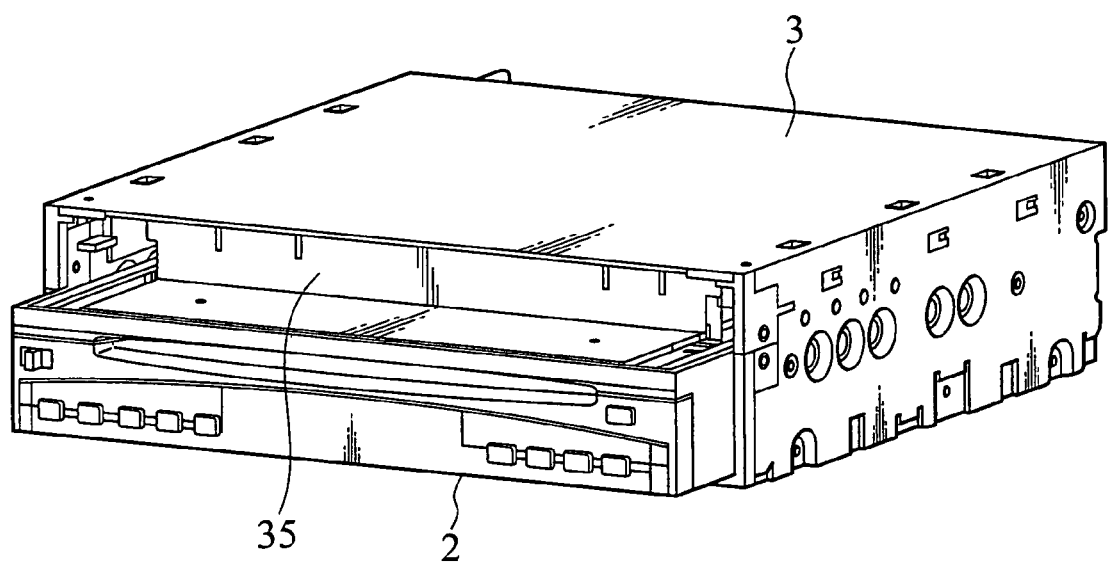
FIG. 20 is a perspective view showing a detachment state of the case body.

Although FIG. 19 shows a state in which the display panel 1 is separated from the panel coupling portion 6, at this time, if the opening portion 3A of the case body 3 remains in the open state, dust and the like enters the inside to adversely affect respective drive mechanisms, electronic equipment, or the like. Thus, it is preferred that in the vicinity of the opening portion 3A, a flap plate 35 as in FIG. 20 is provided inside the case body 3 so that the flap plate 35 is closed in a state in which the display panel 1 does not exist inside the case body 3.

According to the present invention, while crime prevention effect can be obtained due to detachability/attachability of the display panel 1, the display panel 1 can be utilized in a place other than the installation place of the above-mentioned on-vehicle electronic equipment by preparing a compatible device which can drive this display panel 1, whereby convenience can be improved further.

Figure 21:
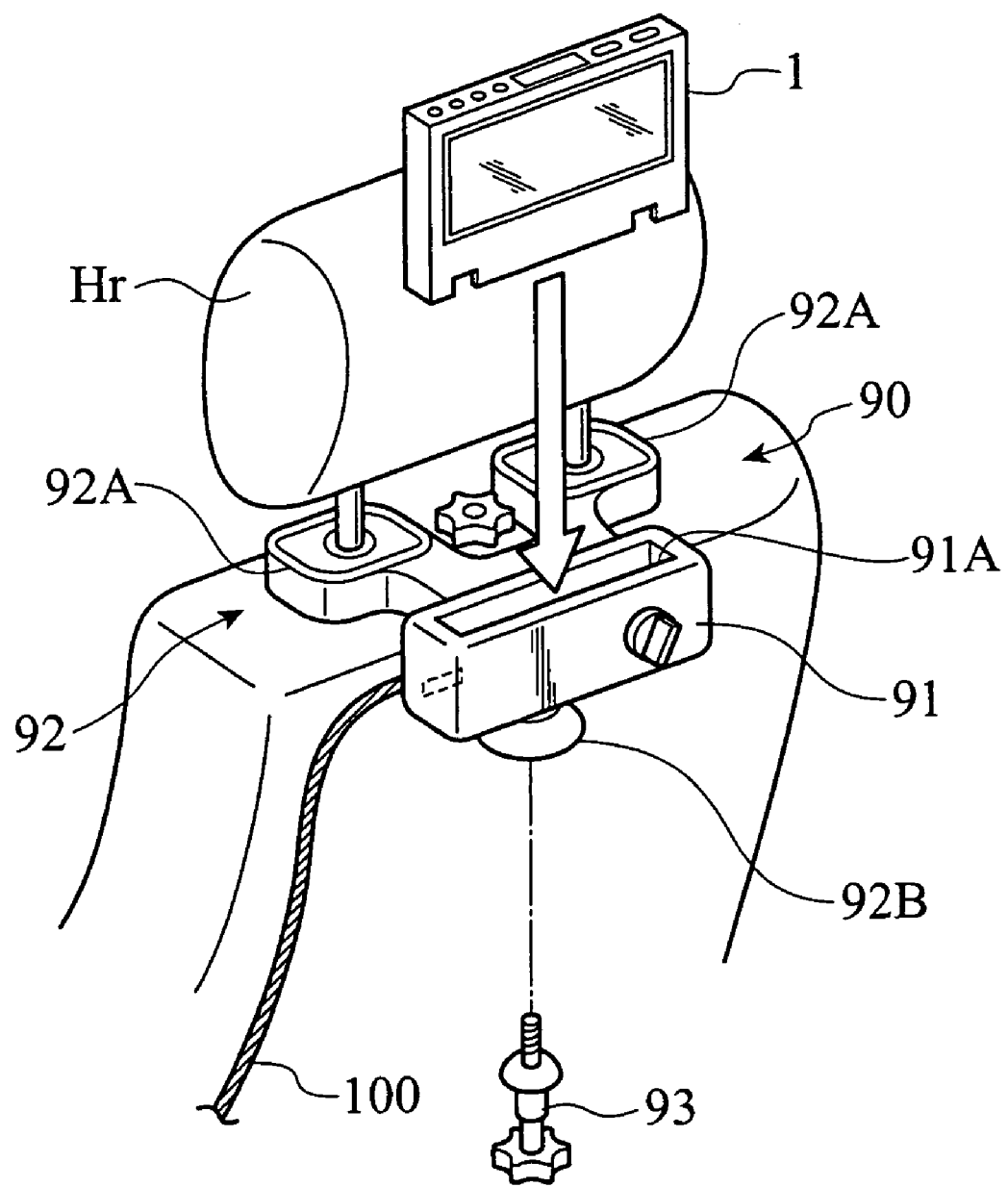
FIG. 21 is a perspective view showing a panel mounting base.

The present invention provides a panel mounting base 90 as exemplified in FIG. 21. This panel mounting base 90 is composed of a base 91 connected to the equipment main body 2 of the on-vehicle electronic equipment by a signal line 100 and an attachment tool 92 for fixing this base 91 on a portion inside the passenger compartment of a vehicle. In the present example, the attachment tool 92 is formed of arm portions 92A which are attachable to struts of a head rest Hr constituting a front seat and a seating portion 92B on which the base 91 is placed so that the base 91 placed on the seating portion 92B can be fixed by means of a tightening screw 93.

Figure 22:
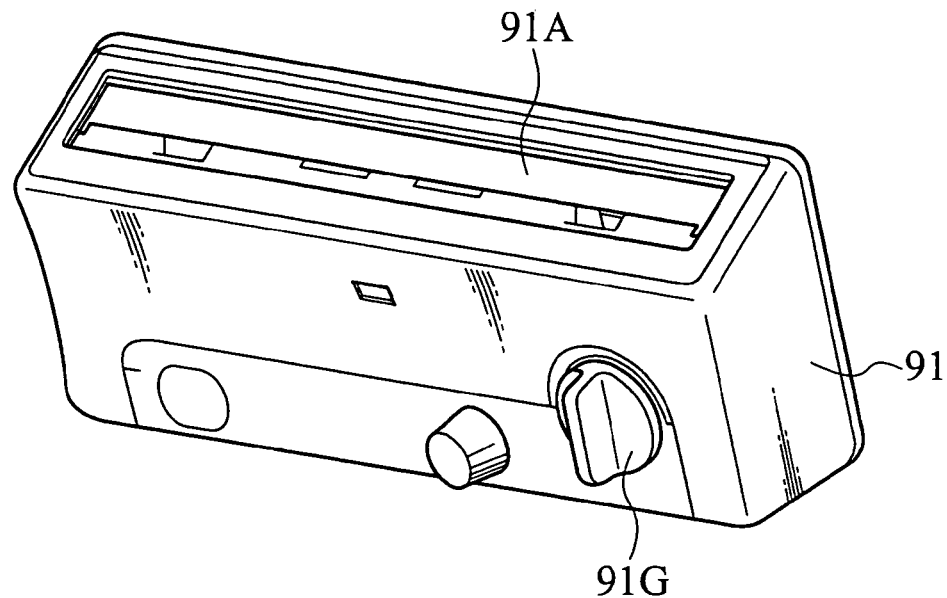
FIG. 22 is a perspective view of a base constructing the panel mounting base.
Figure 23:
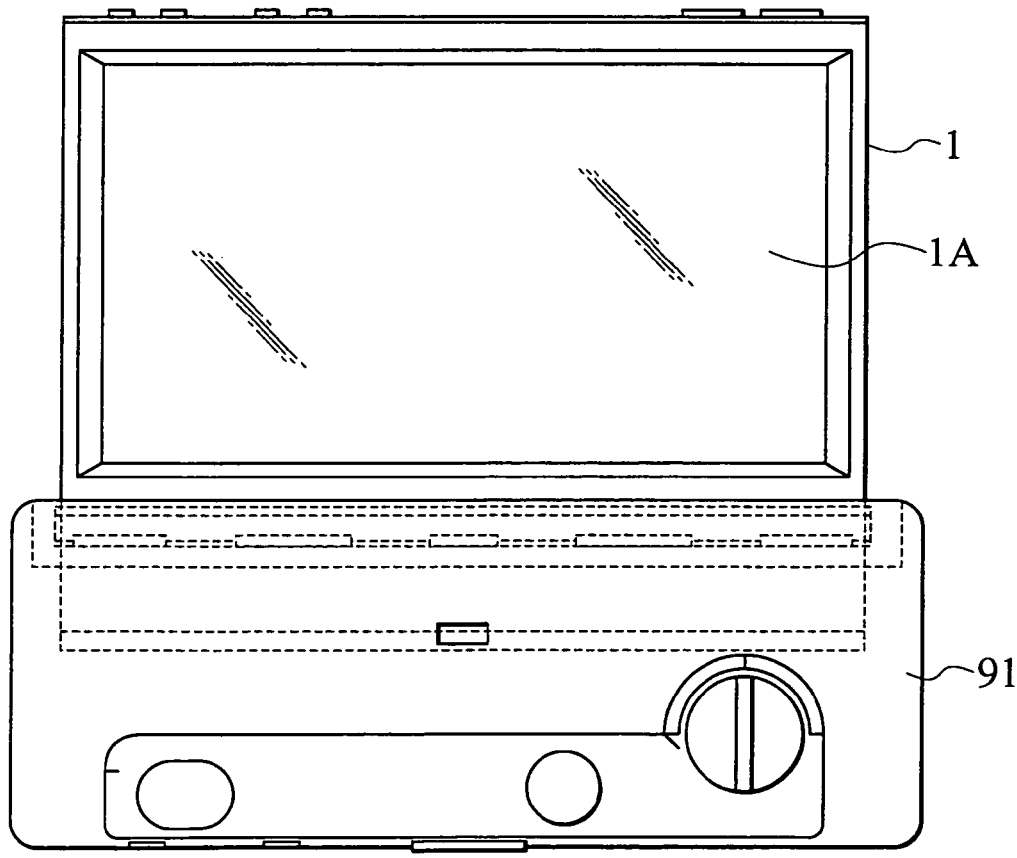
FIG. 23 is a front view showing a state in which the display panel is mounted on the base.

Meanwhile, as is apparent from FIGS. 21 and 22, in an upper portion of the base 91, an insertion opening 91A into which a lower end portion (coupling portion 6) of the display panel 1 is fitted is formed. The display panel 1 fitted into the insertion opening 91A is constructed so as to be fixed in a standing posture in a state in which the display surface 1A is exposed as shown in FIG. 23.

Figure 24:
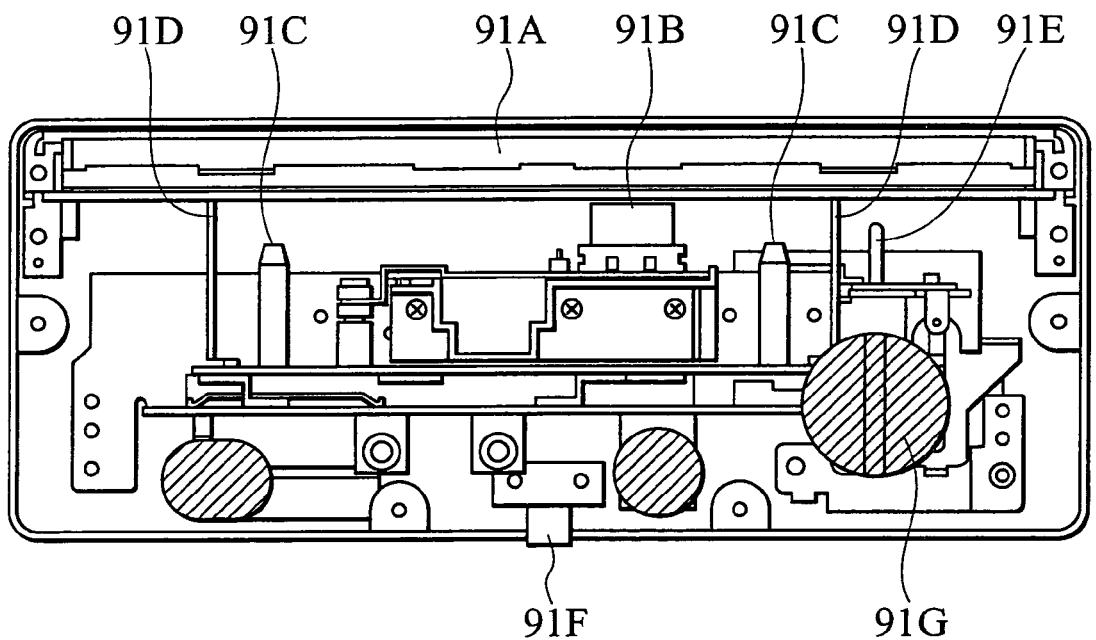
FIG. 24 is a perspective diagram showing an internal structure of the base.

Referring to FIG. 24, similarly to the panel coupling portion 6, provided inside the insertion opening 91A are a signal output portion 91B connected to the signal input portion 18 of the display panel 1 shown in FIGS. 3 and 4, a pair of left and right guide pins 91C inserted into the pin insertion holes 19, a pair of left and right latches 91D inserted into the lock holes 20, and a pin 91E inserted into the lock operation hole 21. In FIG. 24, reference character 91F represents a screw hole for screwing the tightening screw 93 of FIG. 21.

One end of the signal line 100 is connected to the signal output portion 91B. The pin 91E operates by an operation of a switching lever 91G provided on a surface of the base 91 to be able to lock and release the lock of the display panel 1. The structure of the base 91 is not limited to this configuration, and at least the signal output portion 91B may be provided on the insertion opening 91A, so that a visual signal transmitted from the equipment main body 2 via the signal line 100 can be inputted to the display panel 1, whereby an image can be displayed.

Figure 25:
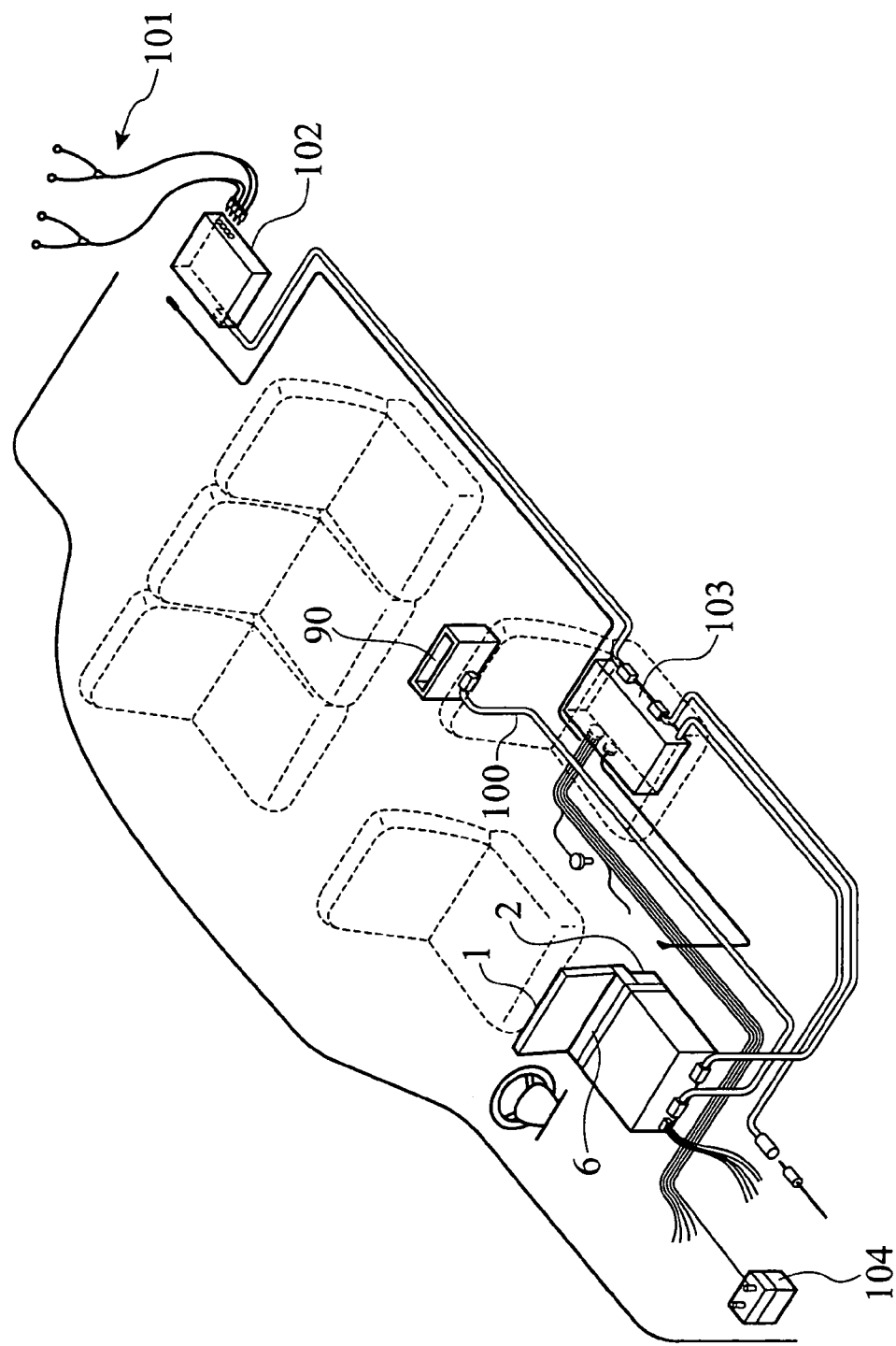
FIG. 25 is perspective diagram of a vehicle showing an example of arrangement of the equipment according to the present invention.

With the panel mounting base 90 as described above, recorded information of a disk (for example, a movie recorded in a DVD) driven by the equipment main body 2 and television broadcasting can be appreciated even when a person is at a rear seat of a vehicle. In order to receive television broadcasting, as shown in FIG. 25, a television antenna 101, a television tuner 102 connected thereto, and the like are loaded on a vehicle, and the tuner 102 and the equipment main body 2 are connected via a controller 103 so that an output signal (visual signal) thereof is inputted from the equipment main body 2 to the panel coupling portion 6 and the panel mounting base 90. Although the controller 103 is connected to a battery 104 of the vehicle and an unillustrated speaker, the controller 103, the television tuner 102, and the like may also be incorporated inside the equipment main body 2.

While the present invention has been described above, the embodiment thereof is not limited to the above-described structure and manner, and it is needless to say that changes may be made therein without departing from the spirit and scope of the invention. For example, two display panels 1 may be employed to be mounted on both the equipment main body 2 and the panel mounting base 90. In this case, by arranging the panel mounting base 90 in a rear side of a font seat as described above, a display image can be viewed both at the front eat and the rear seat simultaneously.

By providing a plurality of independent output systems in the equipment main body 2, independent information can be displayed on the respective screens of the two display panels 1. For example, a television image displayed on the display panel 1 attached to the equipment main body 2 can be enjoyed at the front seat, and a DVD image displayed on the display panel 1 attached to the panel mounting base 90 can be enjoyed at the rear seat.

Further, the panel mounting base 90 connected to the equipment main body 2 is not limited to a single one, and a plurality of panel mounting bases 90 may be connected. A plurality of display panels 1 may be mounted to an arbitrary base of the plurality of panel mounting bases 90. Thus, for example, even in a vehicle with a large number of seats such as an airplane and a sightseeing bus, by installing the panel mounting bases 90 for respective seats and by mounting the display panels 1 thereto respectively, passengers can view display at a short distance. In this case, by equipping a predetermined number of independent output channels in the equipment main body 2, desired video or the like can be enjoyed on respective display panels independently.

The display surface of the display panel 1 may be of a touch panel type so that operations of this equipment are performed through the touch panel. In this case, the connection between the panel mounting base 90 and the equipment main body 2 is two-way. In a case where a plurality of display panels are loaded in a vehicle, control can be performed in which from an arbitrary display panel an image and the like displayed on another display panel can be selected and the like.

Further, with the on-vehicle electronic equipment according to the present invention, by drive of the traveling mechanism and the panel revolution mechanism provided in the traveling unit, the discharge and open operations of the display panel can be performed automatically. Moreover, since the panel coupling portion 6 coupling the display panel 1 detachably and attachably is provided in the traveling unit, the display panel 1 can be carried away from the vehicle during parking time or the like to prevent theft. Moreover, since the display panel 1 can be utilized as a television monitor or the like at a variety of places using a compatible device which can drive the display panel 1, convenience is improved drastically.

Since the display panel 1 can be prevented from being detached from the panel coupling portion 6 by the operation of the panel revolution mechanism provided in the traveling unit 4, there is an effect that theft of the display panel 1 can be prevented even when the vehicle is left with the display panel 1 which is not detached from the panel coupling portion 6.

Further, since separation of the display panel 1 is prevented since the locking tool 64 provided on the panel coupling portion 6 is at the lock position at the time of opening/revolving of the display panel 1, the display panel 1 is not detached to inadvertently fall out of the panel coupling portion 6 during the time of revolution of the display panel 1. Moreover, since the operation amount of the panel revolution mechanism 80 is detected by the sensor S to control the revolution angle of the panel coupling portion 6, the posture of the display panel 1 coupled therewith can be regulated to improve the visual recognition of the display surface 1A, and by the work of such a sensor S, even the switching operation between the release position and the lock position of the locking tool 64 can be controlled reliably.

Since the signal output portion for inputting a visual signal to the display panel 1 and the guide pin 23C inserted into the display panel 1 are provided on the panel coupling portion 6, not only can the display panel 1 coupled with the panel coupling portion 6 be driven, but the display panel 1 can be coupled correctly at a regular position by means of the guide pin 23C.

Meanwhile, since the display panel 1 separated from the panel coupling portion 6 can be coupled with the panel mounting base 90 to be driven, and further since the panel mounting base 90 is fixed on a portion of a vehicle by means of the attachment tool, by attaching this display panel 1 to the back surface of a front seat, the display panel 1 can be utilized as a television monitor or the like for a rear seat when the car navigation is not used and the like.

With the display panel 1 according to the present invention, since one end portion in a direction intersecting with the display surface 1A is the operation portion 1B2, the operation switches do not appear on the display surface side in using it to impart an aesthetic effect, and when the operation portion 1B2 is laid facing an operator side, a needed operation can be performed.

Further, since the input terminal obtaining the visual signal from the outside is equipped, the display panel 1 need not be formed integrally with a drive device such as a disk driver or the like and can be thin, whereby portability is facilitated.

Moreover, since the lock mechanism 22 is incorporated, the lock mechanism 22 can be locked with a coupling partner equipment, whereby such effects that slipping off and theft are prevented can be obtained. Further, such a lock operation and its release operation can be performed from the outside utilizing the lock operation hole 21.

Furthermore, since the input terminal 18, the lock hole 20, and the pin insertion hole 19 are provided in the recess-like socket which is formed in such a manner that one end edge of the back surface of the outer frame opposing the window portion extends toward the inside, and since the socket is a coupling portion with respect to the attachment portion, the appearance in using it in a coupled state with the attachment portion is excellent, and the lock operation hole 21 does not appear outside when the lock operation hole also 21 is provided on the socket, whereby theft prevention effect is improved.

What is claimed is:

1. An on-vehicle electronic equipment comprising:
   a display panel having a display surface;
   a case body accommodating the display panel;
   a traveling unit which is movably provided inside the case body and which allows the display panel to move in insertion direction and eject direction with respect to the case body,
   a guide portion provided inside the case body to guide the movement of the traveling unit; and
   a drive source, wherein
   the traveling unit further including:
      a traveling mechanism reciprocating along the guide portion,
      a revolvable panel coupling portion attachably and detachably coupling the display panel with the traveling unit, and
      a panel revolution mechanism revolving the display panel ejected from the case body and the panel coupling portion by a drive force generated by the drive source being rotated in a first direction so that the display surface of the display panel faces in a eject direction of the display panel with respect to the case body,
   the panel coupling portion further including a locking tool for
   locking the display panel to the traveling unit, and
   wherein the locking tool is moved between a release position at which separation of the display panel from the traveling unit is allowed by the panel revolution mechanism and a lock position at which the separation of the display panel from the traveling unit is prevented, and the movement from the lock position to the release position of the locking tool is performed by a drive force generated by the drive source being rotated in a second direction which is a reverse direction to the first direction of the drive source.

2. The on-vehicle electronic equipment according to claim 1, wherein
   the panel revolution mechanism has a lacking tooth gear fixed on a revolution fulcrum shaft of the panel coupling portion and a transmission gear meshing with this lacking tooth gear,
   the locking tool has a gear portion meshing with the transmission gear and a lock arm inserted into the display panel, and wherein
   power generated by the drive source is transmitted from the transmission gear to the gear portion in a state in which the lacking tooth gear and the transmission gear are uncoupled while the locking tool is moved from the lock position to the release position, and
   the lacking tooth gear and the transmission gear are meshed with each other while the locking tool is maintained at the lock position at the time of revolution of the display panel.

3. The on-vehicle electronic equipment according to claim 1, wherein the traveling unit has a sensor detecting an operation amount of the panel revolution mechanism, in order to control the moving between the release position and the lock position of the locking tool and a revolution angle of the panel coupling portion.

4. The on-vehicle electronic equipment according to claim 1, wherein the panel coupling portion has a signal output portion inputting a visual signal to the display panel and a guide pin inserted into the display panel.

5. A panel mounting base connected to the on-vehicle electronic equipment of claim 1 by a signal line, the panel mounting base having a base with an insertion opening into which one end of the display panel is fitted in a standing posture of the display panel and an attachment tool for fixing the base on a part inside a passenger compartment of a vehicle, wherein a signal output portion which is coupled with the display panel so that a visual signal transmitted via the signal line is inputted to the display panel is provided inside the insertion opening of the base.

6. A display panel having a display surface comprising:
   an outer frame which has a window portion to expose the display surface from the window portion;
   an operation portion including operation switches provided on one end side in the direction intersecting with the display surface on the outer frame;
   an input terminal provided on the other end side of the outer frame opposing the one end side and connected to an output terminal provided on an attachment portion being attached with the display panel for transmitting a visual signal;
   a lock hole provided on the other end side of the outer frame and equipped with a hooking claw;
   a pin insertion hole provided on the other end side of the outer frame for positioning with respect to the attachment portion; and
   a lock mechanism provided inside the outer frame and including a trigger lever restraining the hooking claw and a slide plate for maintaining the restraint of the hooking claw by the trigger lever.

7. The display panel according to claim 6, wherein a lock operation hole for operating the slide plate from the outside is provided on the other end side of the outer frame.

8. The display panel according to claim 7, wherein the input terminal, the lock hole, the pin insertion hole, and the lock operation hole are provided on a recess-like socket which is formed in such a manner that one end edge of the back surface of the outer frame opposing the window portion extends toward the inside, and the socket performs as a coupling portion with respect to the attachment portion.

9. The display panel according to claim 6, wherein the input terminal, the lock hole, and the pin insertion hole are provided or a recess-like socket which is formed in such a manner that one end edge of the back surface of the outer frame opposing the window portion extends toward the inside, and the socket performs as a coupling portion with respect to the attachment portion.

* * * * *